US010911326B2

United States Patent
Han et al.

(10) Patent No.: US 10,911,326 B2
(45) Date of Patent: Feb. 2, 2021

(54) METHOD AND APPARATUS FOR UTILIZING DATA COLLECTION AND ANALYSIS FUNCTION IN WIRELESS COMMUNICATION SYSTEM

(71) Applicant: Samsung Electronics Co., Ltd., Gyeonggi-do (KR)

(72) Inventors: Yoonseon Han, Gyeonggi-do (KR);
Sunghoon Kim, Gyeonggi-do (KR);
Youngkyo Baek, Gyeonggi-do (KR);
Kyungjoo Suh, Gyeonggi-do (KR);
Jungje Son, Gyeonggi-do (KR);
Hoyeon Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/417,983

(22) Filed: May 21, 2019

(65) Prior Publication Data

US 2019/0356558 A1    Nov. 21, 2019

(30) Foreign Application Priority Data

May 21, 2018  (KR) .................. 10-2018-0057996
Jun. 21, 2018  (KR) .................. 10-2018-0071687

(51) Int. Cl.
*G06F 15/173*  (2006.01)
*H04L 12/24*  (2006.01)
*H04L 29/08*  (2006.01)

(52) U.S. Cl.
CPC .......... *H04L 41/5009* (2013.01); *H04L 41/12* (2013.01); *H04L 41/14* (2013.01); *H04L 67/16* (2013.01); *H04L 67/26* (2013.01)

(58) Field of Classification Search
CPC ..... H04L 41/5009; H04L 41/12; H04L 41/14; H04L 67/16; H04L 67/26
See application file for complete search history.

(56) References Cited

U.S. PATENT DOCUMENTS

2014/0280338 A1   9/2014  Metz et al.
2017/0332282 A1*  11/2017  Dao .................... H04L 41/5009
(Continued)

FOREIGN PATENT DOCUMENTS

WO   WO-2019158777 A1 *  8/2019  ......... H04L 43/0876
WO   WO-2019184433 A1 * 10/2019  ............ H04W 24/08
(Continued)

OTHER PUBLICATIONS

China Mobile et al., "General Framework for 5G Network Automation", S2-183938, SA WG2 Meeting #127, Apr. 16-20, 2018, 3 pages.
(Continued)

*Primary Examiner* — Richard G Keehn
(74) *Attorney, Agent, or Firm* — The Farrell Law Firm, P.C.

(57) ABSTRACT

Disclosed is a method of adding a type of network-related analysis information provided by a network data analytics function (NWDAF), including: receiving, by the NWDAF, an analytic information addition request requesting addition of new network-related analytic information, and transmitting, from the NWDAF, a response message including information about whether the new network-related analytic information has been added, in response to the analytic information addition request, wherein the network-related analytic information is obtained by analyzing information collected from at least one entity in a network and the analytic information addition request includes information about a definition of the new network-related analytic information.

19 Claims, 10 Drawing Sheets

(56) References Cited

U.S. PATENT DOCUMENTS

| | | |
|---|---|---|
| 2018/0077590 A1 | 3/2018 | Sharma et al. |
| 2018/0262924 A1* | 9/2018 | Dao .................. H04W 72/1257 |
| 2019/0222489 A1* | 7/2019 | Shan .................... H04L 41/5009 |
| 2020/0228420 A1* | 7/2020 | Dao ..................... H04L 41/5009 |
| 2020/0244557 A1* | 7/2020 | Nie ..................... H04L 43/0823 |

FOREIGN PATENT DOCUMENTS

| | | | | |
|---|---|---|---|---|
| WO | WO-2019192366 A1 * | 10/2019 | ............ | H04W 12/12 |
| WO | WO-2019197467 A1 * | 10/2019 | ............. | H04L 41/14 |

OTHER PUBLICATIONS

China Mobile, "Clarification on Nnwdaf_Analytics_Info_Service", S2-184589, 3GPP TSG-SA WG1 Meeting #127, Apr. 16-20, 2018, 2 pages.
Nokia, Nokia Shanghai Bell, "TR 23.791: Key Issue on Analytic Information Exposure to AF", S2-182405, SA WG2 Meeting #126, Feb. 26-Mar. 2, 2018, 2 pages.
Huawei et al., "Analytic Information Exposure to SMF for Traffic Handling", S2-183638, SA WG2 Meeting #127, Apr. 16-20, 2018, 4 pages.
International Search Report dated Aug. 28, 2019 issued in counterpart application No. PCT/KR2019/006031, 11 pages.

\* cited by examiner

METHOD AND APPARATUS FOR UTILIZING DATA COLLECTION AND ANALYSIS FUNCTION IN WIRELESS COMMUNICATION SYSTEM

CROSS-REFERENCE TO RELATED APPLICATION(S)

This application is based on and claims priority under 35 U.S.C. § 119 to Korean Patent Application No. 10-2018-0057996, filed on May 21, 2018, and Korean Patent Application No. 10-2018-0071687, filed on Jun. 21, 2018, in the Korean Intellectual Property Office, the disclosures of which are incorporated by reference herein in their entirety.

BACKGROUND

1. Field

The disclosure relates generally to a wireless communication system, and more particularly, to a method and apparatus for utilizing a data collection and analysis function in a wireless communication system.

2. Description of Related Art

To meet the increasing demand for wireless data traffic after the commercialization of $4^{th}$ generation (4G) communication systems, extensive efforts have been made to develop pre-$5^{th}$ generation (5G) communication systems or 5G communication systems, which are also referred to as 'beyond 4G network communication systems' or 'post long-term evolution (LTE) systems.' A 5G communication system defined by 3GPP is referred to as a new radio (NR) system. In order to achieve a high data transmission rate, 5G communication systems are being developed to be implemented in a super-high frequency band (millimeter wave (mmWave)), such as 60 GHz.

In order to reduce the path loss of radio waves in such a super-high frequency band and to increase a transmission distance of radio waves in 5G communication systems, such technologies that are being studied for application to NR systems are beamforming, massive multiple-input multiple-output (MIMO), full dimensional MIMO (FD-MIMO), array antennas, analog beam-forming, and large-scale antennas. In order to improve system networks for 5G communication systems, various technologies have been developed, such as: evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Other technologies have been developed, for 5G communication systems, such as hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed configurations, such as objects, exchange information with each other to process the information. Internet of everything (IoE) technology is emerging, in which technology related to the IoT is combined with technology for processing big data through connection with a cloud server. In order to implement the IoT, various technological components are required, such as sensing technology, wired/wireless communication and network infrastructures, service interface technology, and security technology. In recent years, technologies including a sensor network for connecting objects, machine to machine (M2M) communication, machine type communication (MTC), etc. have been studied. In the IoT environment, intelligent Internet technology services may be provided to collect and analyze data obtained from objects connected to each other to enhance human life. As existing information technology (IT) techniques and various industries converge and combine with each other, the IoT may be applied to various fields, such as smart homes, smart buildings, smart cities, smart cars or connected cars, smart grids, health care, smart home appliances, and high quality medical services.

Various attempts are being made to apply 5G communication systems to the IoT network. For example, technologies related to sensor networks, M2M communication, and MTC are being implemented by using 5G communication technology including beam-forming, MIMO, and array antennas. The application of cloud-radio access network (RAN) as a big data processing technology described above may be an example of convergence of 5G communication technology and IoT technology.

As described above, various services are able to be provided due to the development of mobile communication systems. However, there is presently a deficiency in the art for providing these services to consumers.

As such, there is need for methods of effectively providing such services in mobile communication systems.

SUMMARY

An aspect of the disclosure is to address at least the above-mentioned problems and/or disadvantages and to provide at least the advantages described below. Accordingly, an aspect of the disclosure is to provide an apparatus and method for effectively providing a service in a mobile communication system.

In accordance with an aspect of the disclosure, a method of adding a type of network-related analysis information provided by a network data analytics function (NWDAF) includes receiving, by the NWDAF, an analytic information addition request requesting an addition of new network-related analytic information, and transmitting, from the NWDAF, a response message including information about whether the new network-related analytic information has been added, in response to the analytic information addition request, wherein the network-related analytic information is obtained by analyzing information collected from at least one entity in a network, and wherein the analytic information addition request includes information about a definition of the new network-related analytic information.

In accordance with another aspect of the disclosure, a method of adding a type of network-related analytic information provided by an NWDAF includes transmitting, to the NWDAF, an analytic information addition request requesting an addition of new network-related analytic information, and receiving, from the NWDAF, a response message including information about whether the new network-related analytic information has been added, in response to the analytic information addition request, wherein the network-related analytic information is obtained by analyzing information collected from at least one entity in a network, and wherein the analytic information addition request includes information about a definition of the new network-related analytic information.

In accordance with another aspect of the disclosure, an NWDAF includes a transceiver, and at least one processor coupled with the transceiver and configured to receive, by the NWDAF, an analytic information addition request requesting addition of new network-related analytic information, and transmit, from the NWDAF, a response message including information about whether the new network-related analytic information has been added, in response to the analytic information addition request, wherein the network-related analytic information is obtained by analyzing information collected from at least one entity in a network, and wherein the analytic information addition request includes information about a definition of the new network-related analytic information.

In accordance with another aspect of the disclosure, an NF includes a transceiver, and at least one processor coupled with the transceiver and configured to transmit, to an NWDAF, an analytic information addition request requesting addition of new network-related analytic information and receive, from the NWDAF, a response message including information about whether the new network-related analytic information has been added, in response to the analytic information addition request, wherein the new network-related analytic information is obtained by analyzing information collected from at least one entity in a network, and wherein the analytic information addition request includes information about a definition of the new network-related analytic information.

In accordance with another aspect of the disclosure, a method of providing network-related analytic information available to an NWDAF includes receiving a provision request of a list of available network-related analytic information; and providing the list of available network-related analytic information in response to the request, wherein the available network-related analytic information is obtained by analyzing information collected from at least one NF and at least one application function (AF) in a network.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
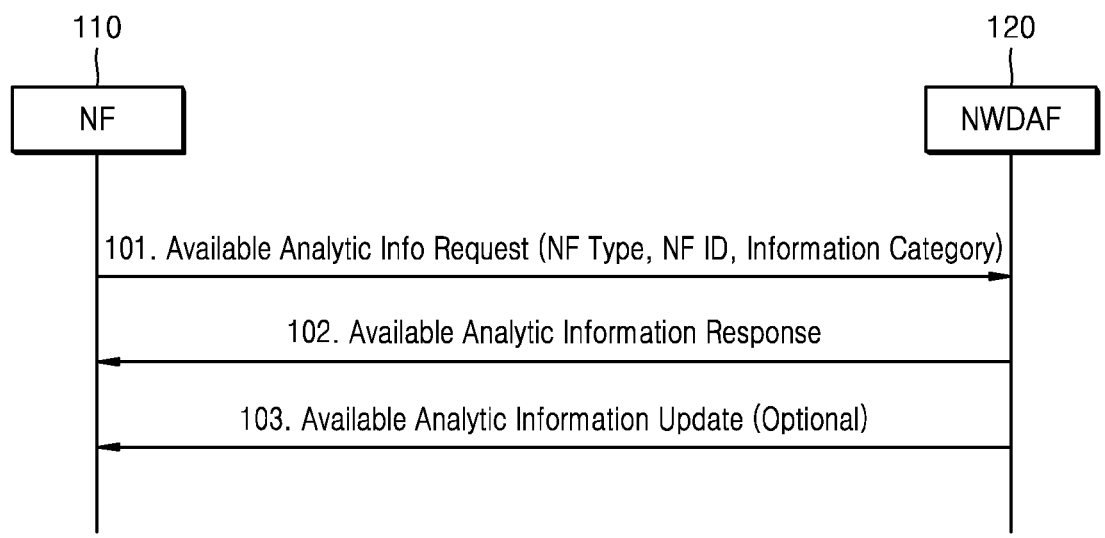
FIG. 1 illustrates a procedure by which an NF requests available analytic information from an NWDAF and receives a response, according to an embodiment.

Hereinafter, embodiments of the disclosure will be described with reference to accompanying drawings. Detailed descriptions of known functions and configurations incorporated here will be omitted for the sake of clarity and conciseness.

Similarly, components may be exaggerated, omitted, or schematically illustrated in the drawings for clarity, and the size of each component may not completely reflect the actual size. In the drawings, like reference numerals denote like elements.

Each element included in the disclosure is expressed in a singular form or a plural form. However, for convenience of description, the expression in the singular form or the plural form is selected to be appropriate for a provided situation, and thus, the disclosure is not limited to the singular form or the plural form. Accordingly, even when an element is expressed in a plural form, the element may be configured in a singular form, and even when an element is expressed in a singular form, the element may be configured in a plural form.

As used herein, the expression "and/or" includes any and all combinations of one or more of the associated listed items, and the expression "at least one of a, b or c" indicates only a, only b, only c, both a and b, both a and c, both b and c, all of a, b, and c, or variations thereof.

Advantages and features of one or more embodiments of the disclosure and methods of accomplishing the embodiments may be understood more readily by reference to the following detailed description of the embodiments of the disclosure and the accompanying drawings. In this regard, embodiments of the disclosure may have different forms and should not be construed as being limited to the descriptions set forth herein, but rather, are provided so that this disclosure will be thorough and complete and will fully convey the concept of the embodiments of the disclosure to one of ordinary skill in the art.

It will be understood that combinations of blocks in flowcharts or process flow diagrams may be performed by computer program instructions which may be loaded into a processor of a general purpose computer, a special purpose computer, or another programmable data processing apparatus. Thus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus, may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations (or steps) are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or in a reverse order according to the corresponding function.

Herein, the term "unit" indicates a software component or hardware component such as a field-programmable gate array (FPGA) or an application-specific integrated circuit (ASIC), and performs a specific function, but is not limited to software or hardware, and may be formed so as to be in an addressable storage medium, or to operate one or more processors. Thus the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", may be divided into additional components and "units", or may be embodied to reproduce one or more central processing units (CPUs) in a device or security multimedia card. The "unit" may also include at least one processor.

In describing embodiments of the disclosure, the main subject matter is a new RAN (NR) on a 5G mobile communication standard specified by the 3GPP that is a mobile communication standard standardization group, and a packet core that is a core network (5G system, 5G core network, or next-generation (NG) core), but aspects of the disclosure may be applied to another communication system having a similar technical background, with slight modifications within the scope not departing from the scope of the disclosure, and such application may be determined by one of ordinary skill in the art.

A 5G system defines an NWDAF that is a network function of providing a function of analyzing and providing data collected in a 5G network, to support network automation. The NWDAF is able to collect, store, and analyze information from the 5G network and provide results to an unspecified NF, and the result of analysis may be independently used by each NF.

Hereinafter, for convenience of description, some terms and names defined by the 3GPP standard may be used, but the disclosure is not limited thereto, and may be identically applied to a system following another standard.

Also, terms for identifying access nodes, or for denoting network entities, messages, interfaces between network entities, or various types of identification information, are exemplified for convenience of description. Thus, the terms used in the disclosure are not limited and other terms denoting targets having the same or similar technical meanings may be used.

Disclosed is a method, performed by NFs, of requesting analysis via an NWDAF and using an analysis result, with respect to using the NWDAF in a 5G mobile communication system.

The 5G mobile communication system supports a method enabling the NFs to use collection and analysis results of network-related information via the NWDAF. Accordingly, collection and analysis of network information that each NF needs to effectively provide functions may be provided in a centralized manner. The NWDAF may collect and analyze the network information by using a network slice as a basic unit. However, the scope of the disclosure is not limited to a network slice unit, and the NWDAF may additionally use various types of information, such as a UE, a packet data unit (PDU) session, and an NF state. A result of the analysis via the NWDAF is transmitted to each NF upon request, and the transmitted analysis result may be used to enhance network management functions, such as quality of service (QoS) guarantee/improvement, traffic control, mobility management, and load distribution.

In such a structure of the NWDAF, a plurality of unspecified NFs have a limitation that a type of data requesting NWDAF collection/analysis and a calculation method are unable to be transmitted. When a new network information definition and a method for calculating the new network information are required, each NF needs to standby until a function of the NWDAF is updated or needs to receive and internally process raw information. In addition, implementation of an actual NWDAF may vary according to apparatus manufacturers, and the NFs may be subject to the implementation of a specific NWDAF. Moreover, when each NF self-performs a required analysis function, data is received from the NWDAF or the NF needs to directly collect the data, and additional resources are used during this process to transmit and analyze unnecessary data. In the disclosure, the NF requesting the NWDAF for information or information collection is expanded to provide a collection or analysis transmission method required by the NF to the NWDAF, thereby increasing utility of the NWDAF and eliminating a phenomenon of being dependent on an NWDAF of a specific implementation.

Entities in the disclosure may be described as follows.

A unit performing each function provided by a 5G network system may be defined as an NF. Examples of a representative NF may include but are not limited to an access and mobility management function (AMF) managing network access and mobility of a UE, a session management function (SMF) performing a session-related function, a user plane function (UPF) managing a user data plane, a network slice selection function (NSSF) selecting a network slice instance usable by a specific UE, and an application function (AF) for providing an efficient service. There may be an NWDAF that is an NF for collecting and analyzing data and is responsible for analyzing and providing, to the NF, information collected from a network or from outside the network. The NWDAF may collect information from operation, administration, and maintenance (OAM), an NF constituting a 5G network, or an AF, through via various methods. According to a representative analysis function of the NWDAF, a load level of the network slice instance may be collected and analyzed, and then provided to the NSSF to be used for a specific UE to select the usage. A service-based interface defined by the 5G network is used to request analytic information or transmit an analysis result value between the specific NF and the NWDAF, and a document of hypertext transport protocol (HTTP) and javascript object notation (JSON) formats may be used for transmission.

In the 5G network, the NWDAF providing collection and analysis functions of information may provide the following services, but are not limited thereto.

Event subscription service (nnwdaf_eventssubscription service): An event subscription service enables a load-related event of a network slice instance generated in an NWDAF to be subscribed or unsubscribed, and may be divided into periodically receiving an event or receiving an event when a specific condition is satisfied. The event subscription service is also referred to as an nnwdaf_events-subscription service and provides three operations of subscription, unsubscription, and notification.

When the specific NF desires subscription, a parameter transmitted from the specific NF to the NWDAF may be divided into mandatory input (inputs required) and optional input (inputs optional) parameters.

According to an embodiment, the mandatory input may include single network slice selection assistance information (S-NSSAI), an event identifier, a notification target address, and event reporting information. However, the mandatory input is not limited thereto, and the optional input may include information additionally required for an analytic information process, and event filter information. However, the optional input is not limited thereto.

Similar to the input of the NF, an output from the NWDAF to the NF may also be divided into a mandatory output and an optional output.

The mandatory output may include subscription correlation identifier information, but is not limited thereto and may include information related to additional outputs, for example. During an unsubscription operation, the NF transmits the subscription correlation identifier information to the NWDAF as the mandatory input, and the NWDAF transmits a message notifying that unsubscription is confirmed to the NF that requested the unsubscription operation as an output. In a notification operation, the NWDAF notifies the NF successfully subscribing to an event of a specific event, periodically or when a specific condition is satisfied. Mandatory input information of the notification operation may include, for example, an event identifier, a notification target address, an identifier of a network slice instance, load level information of a network slice instance, and there may be no mandatory output information.

Analytic information request service (nnwdaf_analytics_info service): Unlike the event subscription service described above, an analytic information request service may denote a service in which an NF requests analysis of specific information and receives a result value as soon as the request is completed. Operations supported by the analytic information request service include request and response. The NF requesting analytic information may transmit an analytic information request to an NWDAF.

Generally, as a mandatory input of the analytic information request, the NF transmits, to the NWDAF, load level information of a network slice instance, an analytic identifier (ID), and parameters additionally required for analysis. Upon receiving the request from the NF, the NWDAF transmits the analysis result to the NF as a response, which includes load level information of a requested slice.

As the analytic information provided through a service provided by the NWDAF, only the load level information of the network slice instance is considered, but the provided information is not only limited to the load level information. For example, the analytic information provided through the service provided by the NWDAF may additionally consider the number of users of the network slice instance, an average load level per time, an average load level per month, a highest load level, or a lowest load level, for example. In addition, an expression form and unit may vary even when the analytic information is identical. In other words, various formats may be provided for identical analytic information. Also, the analytic information provided through the service provided by the NWDAF may consider not only a network slice, but also load information, authority information, and usage history information of an entity constituting a 5G system. Accordingly, the analytic information of the NWDAF that is the subject of the disclosure may include all types of information provided by the NWDAF by processing and analyzing data collected from a 5G network, a management system of an operator, a specified application function, and an external unspecified target.

The disclosure includes a first example of an additional service in which information provided by an NWDAF is notified to an NF before the NF requests specific analytic information from the NWDAF (requesting subscription or analytic information), and a second example of an existing operation expanded such that a specific NF is able to transmit newly defined analytic information and analysis methods while requesting subscription or information. The two examples of the disclosure are independent from each other and may be performed separately or together, but are not restricted as essential components of the disclosure.

So as to use the two services (requesting subscription or analytic information) provided by the NWDAF, the NF and the NWDAF need to agree on the analytic information provided by the NWDAF. The analytic information service provided by the NWDAF may vary based on an implementation method of the NWDAF, and information usable by the NF may vary based on capability of the NWDAF. In addition, when the analytic information provided to the NWDAF is expanded, the NWDAF needs to notify the NFs of the analytic information provided by the NWDAF. In the disclosure, the NWDAF may provide an information list (available analytic information list) provision service in which available analytic information is transmitted to the NF. In addition, via the information list provision service, a specific NF may determine analytic information available to the specific NF.

FIG. 1 illustrates an operation of an information list provision service, according to an embodiment. An NF 110 may request available analytic information from the NWDAF 120 in step 101, and upon receiving the request for the available analytic information, the NWDAF 120 may provide a response to the NF 110 including the available analytic information in step 102. The available analytic information may include analytic information providable by the NWDAF 120, and the response of the NWDAF 120 may include the available analytic information as a list. However, the disclosure is not limited thereto. In steps 101 and 102, there may be no mandatory input information, and in step 103, an NF type, an NF identifier, and an analytic information category may be transmitted as optional input information. The optional input information may also be provided as the mandatory input information, the optional input information from which at least one piece is excluded may be provided to the NWDAF 120, or additional information other than the optional input information may be provided to the NWDAF 120.

When there is no optional input information, the NWDAF 120 may transmit all pieces of providable analytic information or may provide a response indicating that there is no available analytic information. Upon receiving the NF type, the NWDAF 120 may internally select and transmit a group of information related to functions of the NF that requested the available analytic information. For example, when an NSSF in which a specific UE selects an available network slice requests the analytic information list, the NWDAF 120 may transmit a list of information related to the specific UE and information related to the network slice.

The NF identifier may include information for distinguishing the specific NF 110 from other NFs, and an NF address and the NF identifier may be used together. Upon receiving the request for the list including the NF identifier, the NWDAF 120 may transmit the analytic information related to the specific NF.

When the NF requests the analytic information category, the NWDAF 120 may transmit, as a response, the available analytic information based on an information category system pre-agreed on between the NF 110 and the NWDAF 120. In addition, even when the types of NFs requesting the analytic information list are identical, the analytic information list may vary based on the NF identifier. For example, when the AMF directing a specific region requests for the analytic information list, lists of available analytic information may vary based on regions. Also, a service provided when the AF has requested the analytic information list and information provided based on authority may vary.

Figure 2:
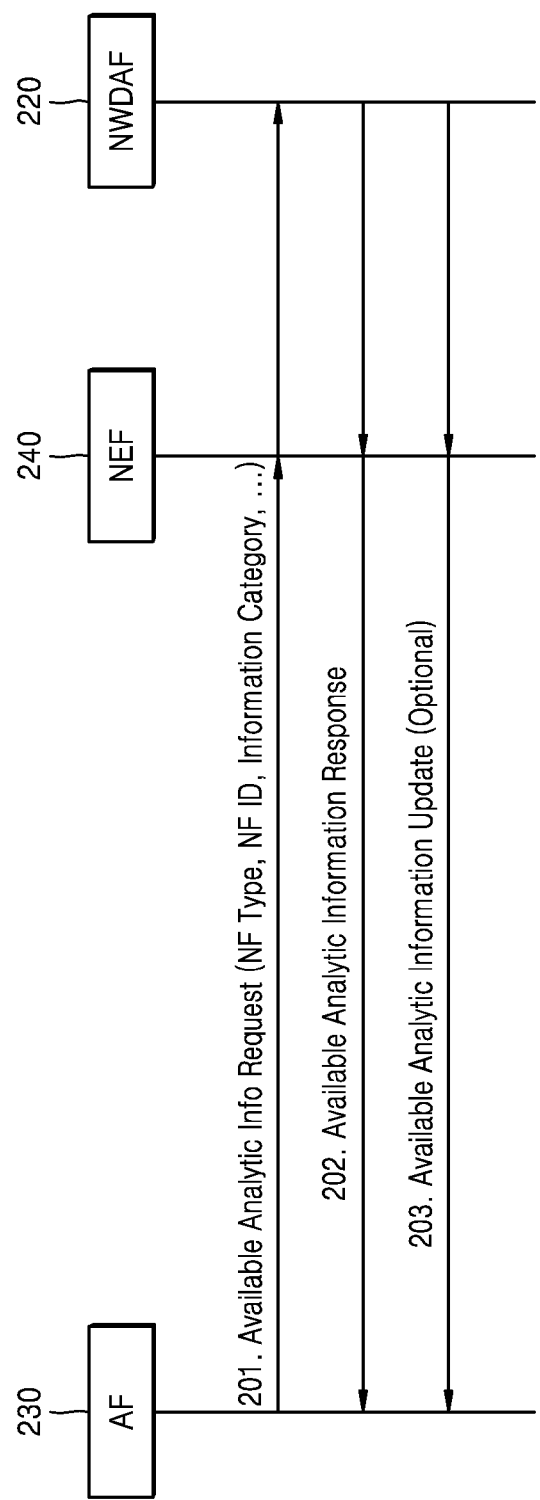
FIG. 2 illustrates a procedure by which an AF requests available analytic information from an NWDAF and receives a response via an NEF, according to an embodiment.

FIG. 2 illustrates when an NWDAF 220 is used via an NEF 240 when an AF 230 uses a service provided by the NWDAF 220.

The AF 230 may be operated by a third party instead of a network operator. Thus, for management of access authority, the NEF 240 may be placed between the AF 230 and the NWDAF 220 and the AF 230 may be enabled to use the NWDAF 220 through the NEF 240, thereby reinforcing security and authority-related matters. In addition, when analytic information available in the NWDAF 220 is changed or added to the NWDAF, the NWDAF 220 may notify the NF in step 103. Step 103 of FIG. 1 is optional, and may be omitted according to implementation. The above service may be summarized as follows.

NWDAF Service Name: Available analytic information request service

Description: Provide list of analytic information available to NF

Mandatory input: None

Optional input: NF type, NF identifier, analytic information category

Mandatory output: List of analytic information available to NF that requested analytic information Optional output: None As described above, the NWDAF service name, the mandatory input, the optional input, the mandatory output, and the optional output may vary based on implementation, and are not limited to the above.

With respect to the NF requesting the NWDAF for the analytic information, the NF may notify the NWDAF of at least one of the analytic information not provided by the current NWDAF or a definition, analysis, method, or form of received analytic information, and the NWDAF may perform analysis and transmit a result thereof based on a requested definition. Load level information of a network slice instance provided by an existing NWDAF may be represented via various methods, such as by an amount of traffic that flows in a unit of time or a percentile rank. The NF may be represented as a percentile rank obtained by dividing the amount of traffic that flows for the unit of time by a largest amount of traffic usable for the unit of time, and in this regard, it may be necessary for the NF to transmit information about a new type of analytic information to the NWDAF.

Figure 3:
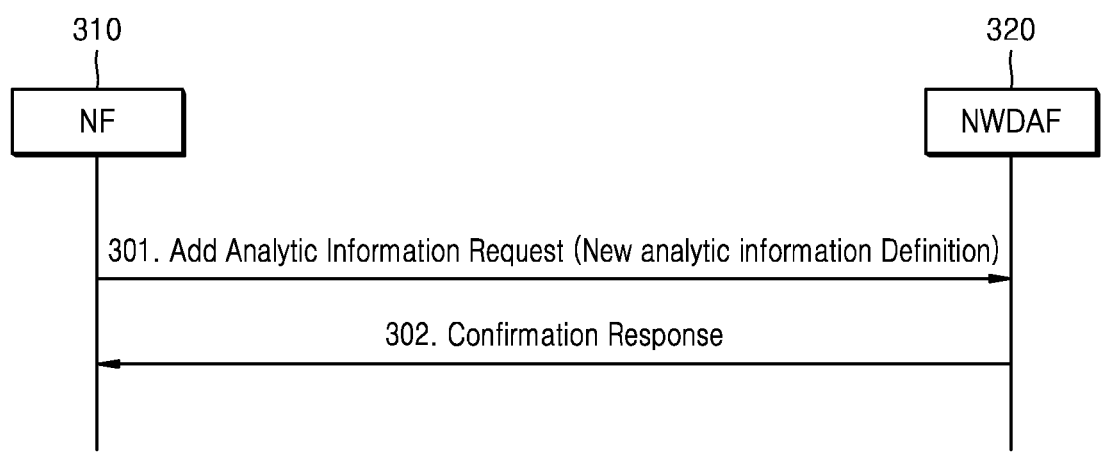
FIG. 3 illustrates a procedure by which an NF adds new analytic information to an NWDAF, according to an embodiment.

FIG. 3 illustrates a process of adding a type of analytic information to support transmission of a new type of analytic information, according to an embodiment. In step 301, analytic information request is sent from the NF 310 to the NWDAF 320. A definition of the new analytic information requested by the NF 310 may be expressed via existing analytic information provided by an NWDAF 320 and a method of processing existing information provided by the NWDAF 320. In step 302, a confirmation response is sent by the NWDAF 320 to the NF 310.

Information may be transmitted between NFs in a 5G network by using a document in HTTP and JSON formats. A method of transmitting the definition of analytic information in a JSON format may include expressing and transmitting an information processing method including an equation, an algorithm, and a form via plain text, and restoring the information processing method via a parser of a receiver or a method corresponding to the parser. When a certain platform is used, an object including a calculation process may be serialized and transmitted. A transmission method is shown in Table 1 and Table 2 below.

In addition, it is possible to transmit the definition of analytic information to be added to the NWDAF via various methods of expressing an equation and an algorithm. By using the method of FIG. 3, the NF is able to self-define its required analytic information and form, thereby solving dependency issues between the NWDAF and the NF.

Figure 4:
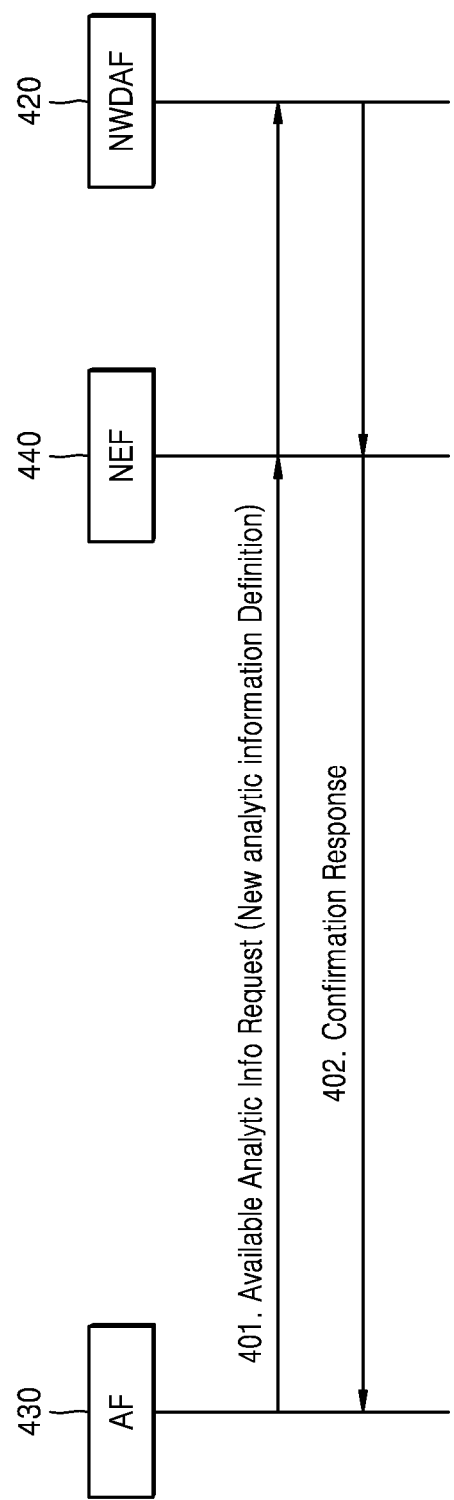
FIG. 4 illustrates a procedure by which an AF adds new analytic information to an NWDAF via an NEF, according to an embodiment.

FIG. 4 illustrates a procedure by which an AF 430 adds new analytic information to an NWDAF 420 via an NEF 440, according to an embodiment, wherein the AF 430 and the NWDAF 420 communicate via an NEF 440, thereby enhancing security or authority-related matters. An available analytic information request is sent by the AF 430 to the NEF 440, and from the NEF 440 to the NWDAF 420, in step 401. A confirmation response is sent from the NWDAF 420 to the NEF 440, and from the NEF 440 to the AF 430, in step 402.

The services described in FIGS. 3 and 4 are summarized as follows.

NWDAF Service Name: New analytic information addition service

Description: Service in which NF transmits required analytic information to NWDAF to add available analytic information Mandatory input: Definition of new analytic information Optional input: None Mandatory output: Whether requested analytic information is added to the NWDAF Optional output: None As described above, the NWDAF service name, the mandatory input, the optional input, the mandatory output, and the optional output may vary based on implementation, and are not limited to the above. Additional inputs of the definition of the new analytic information may include, as lower information of the definition that is NWDAF mandatory input information, a name and description of analytic information, an algorithm for calculating analytic information, and an event filter definition for efficient selection of analytic information, but are not limited thereto. Table 1 and Table 2 appear as follows.

TABLE 1

Table 1. Transmission of Definition of New
Analytic Information via Plain Text

Var Json_request;
Request pre-processing
Json_request.append(
{
"get_average_load" : "function( time_start, time_end){
Total_load =0;
For (i = time star; i<time_end) {
　total_load += get_load(t)
}
Return total_load/((time_end − time start)*get_sampling_rate(load));
}
);
Request transmit

TABLE 2

Figure 5:
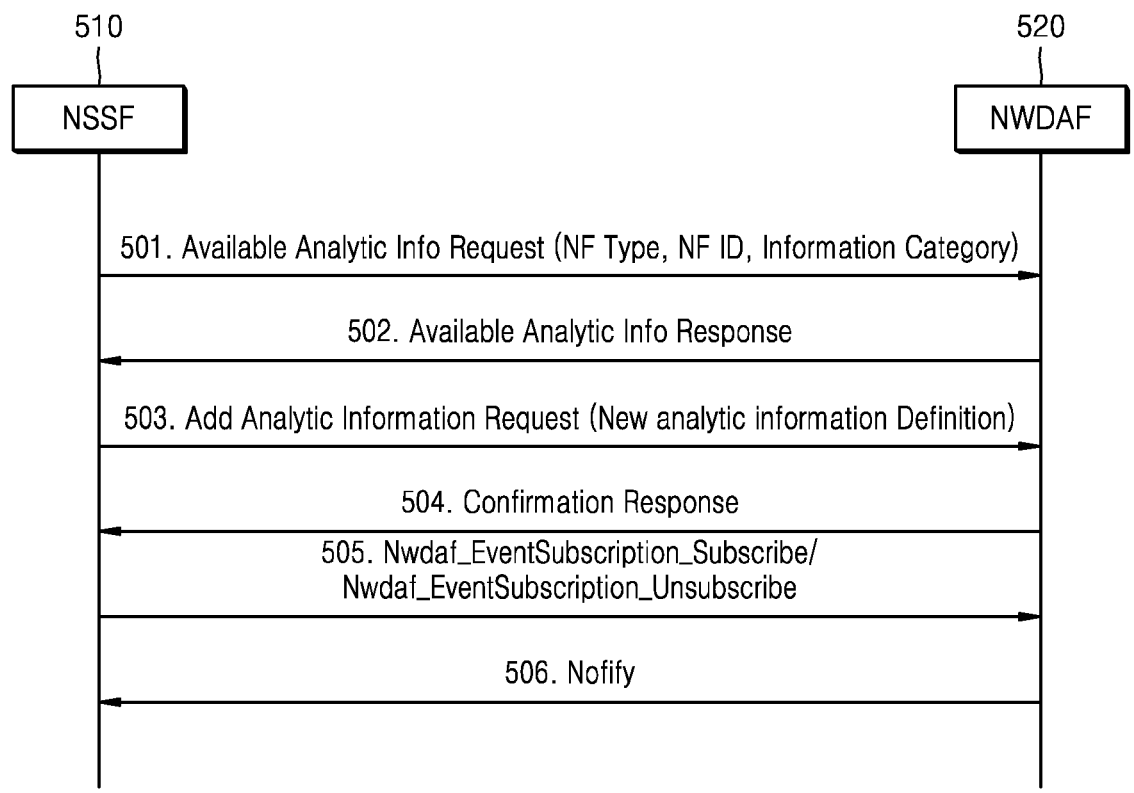
FIG. 5 illustrates a procedure by which an NF uses an event subscription service of an NWDAF, according to an embodiment.

Table 2. Transmission of Definition of New Analytic
Information in Form of Object Var Json_request;
Request pre-processing
Var average_load = function get_average_load ( time_start, time_end) {
Total_load =0;
For (i = time star; i<time_end) {
　total_load += get_load(t)
}
Return total_load/((time_end − time start)*get_sampling_rate(load));
};
Json_request.append(Stringfy(average_load));
Request transmit FIG. 5 illustrates a procedure by which an NF 510 uses an event subscription service of an NWDAF 520, according to an embodiment. The NF 510 requests for available analytic information from the NWDAF 520 by transmitting, as a parameter, an NF type, an NF identifier, or an analytic information category in step 501. Upon receiving the request from the NF 510, the NWDAF 520 provides, as a response, the available analytic information for the NF 510 via an internal method in step 502. The response of the NWDAF 520 may include the available analytic information as a list. Upon receiving the response from the NWDAF 520, the NF 510 determines whether required information is present, and when it is not present, the NF 510 transmits a definition of required information and an equation for deriving the required information to the NWDAF 520 in step 503.

When the NWDAF 520 determines that it is possible to provide new analytic information based on the received definition, the NWDAF 520 transmits a response to the NF 510 indicating that addition has succeeded in step 504. Upon adding the new analytic information to the NWDAF 520, the NF 510 transmits a subscription request to the NWDAF 520 such that the analytic information is received as an event periodically or when a certain condition is satisfied in step 505. Specifically, in step 505, the NF 510 may transmit the newly defined analytic information, an event identifier, a notification target address, and event reporting information to the NWDAF 520. However, the disclosure is not limited thereto, and the NWDAF 520 may internally perform data analysis and notify the NF of a result of the data analysis when a condition of generating a certain event is satisfied in step 506.

According to an embodiment, when the NF is already aware of available analytic information, steps 501 and 502 may be omitted. Also, when the NSSF 510 uses existing information provided by the NWDAF 520, steps 503 and 504 may be omitted. In other words, not all steps of FIG. 5 are essential, and at least one operation may be omitted or an operation may be added based on implementation.

Hereinafter, a method, performed not by an arbitrary NF, but a network function constituting an actual 5G network, such as AMF, SMF, NSSF, PCF, or AF, of subscribing to an analytic information event provided by the NWDAF, will be described.

Figure 6:
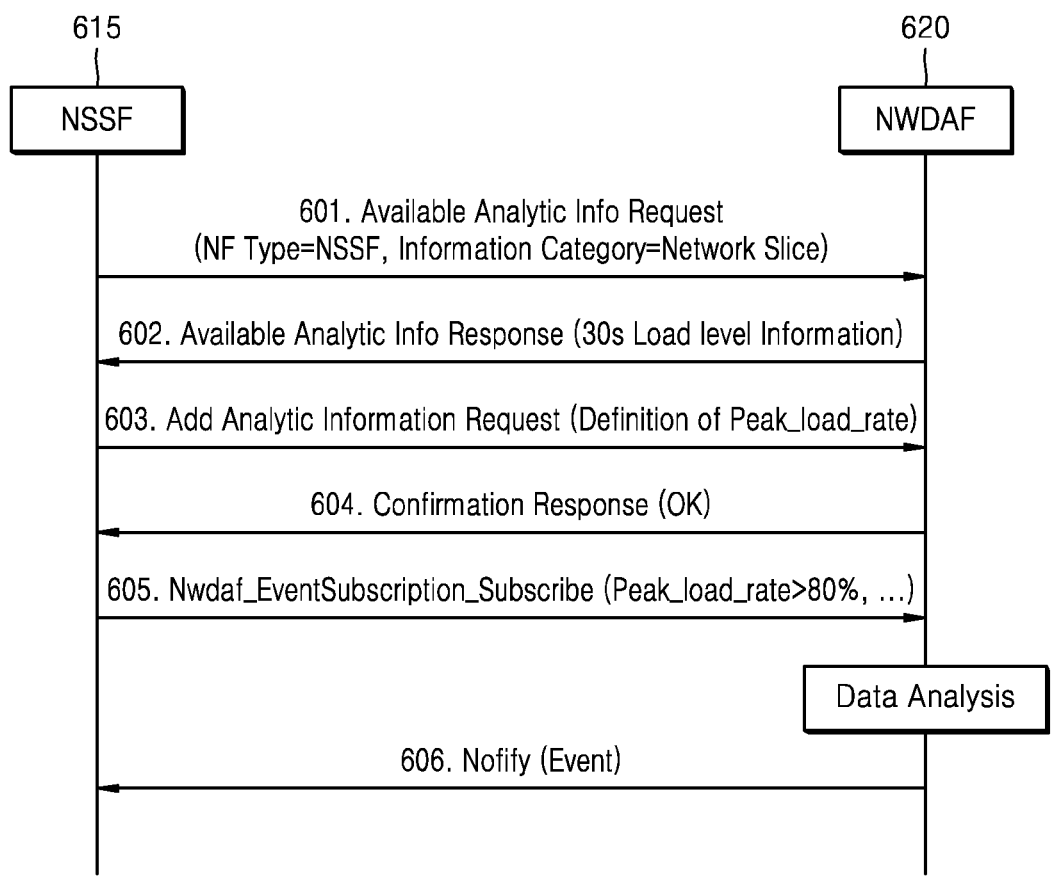
FIG. 6 illustrates detailed a procedure by which an NSSF uses an event subscription service of an NWDAF, according to an embodiment.

FIG. 6 illustrates a procedure by which an NSSF 615 uses an event subscription service of an NWDAF 620, according to an embodiment, wherein the NSSF 615 selects a network slice available to a UE.

The NSSF 615 may request load level information of available network slices from the NWDAF 620 so as to assign a network slice to a new UE. In order to receive a list of network slice information provided by the NWDAF 620, the NSSF 615 having an NF ID of XXXXX requests analytic information related to a network slice in step 601. Upon receiving the request from the NSSF 615, the NWDAF 620 may respond that only load level information of average network slices is provided for 30 seconds as current network slice-related information in step 602. The NSSF 615 uses, as network load level information internally used for determination, a percentile rank of highest load level information of a network slice instance for one minute. The NSSF 615 requests the NWDAF 620 to add the percentile rank of the highest load level information of the network slice instance for one minute as a definition of new analytic information called peak_load_rate in step 603. Upon receiving the request, the NWDAF 620 may add peak_load_rate as the available analytic information and respond to the NSSF 615 regarding the successful addition in step 604. The NSSF 615 may request event subscription from the NWDAF 620 when peak_load_rate of the network slice instance exceeds a load level of a certain value, such as 80%, in step 605. The NWDAF 620 continuously performs data analysis including analysis of peak_load_rate, and notifies the NSSF 615 when the peak_load_rate exceeds the certain load level value in step 606.

Figure 7:
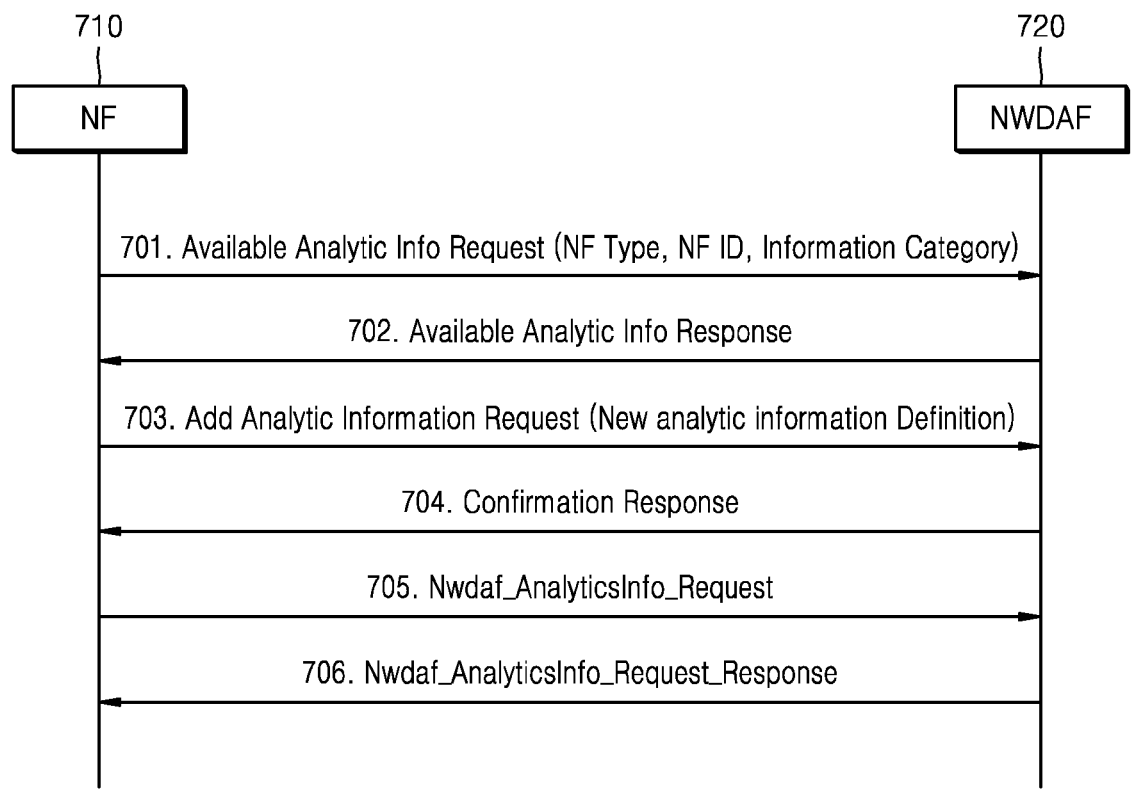
FIG. 7 illustrates a procedure by which an NF requests an NWDAF for an information analysis request service, according to an embodiment.

FIG. 7 illustrates a method, performed by an NF 710, of requesting an NWDAF 720 for use of an information analysis request service, according to an embodiment.

In FIG. 7, the NF 710 requests for available analytic information from the NWDAF 720 by using its own NF type, NF identifier, or an analytic information category as a parameter in step 701. Upon receiving the request from the NF 710, the NWDAF 720 may provide a response including analytic information available to the NF 710 via an internal method. The response provided by the NWDAF 720 may be as a list of analytic information available to the NF 710 in step 702. Upon receiving the response from the NWDAF 720, the NF 710 determines whether required information is present, and when it is not present, the NF 710 transmits a definition of required information and an equation for deriving the required information to the NWDAF 720 in step 703. When the NWDAF 720 determines that it is possible to provide new analytic information based on the received definition, the NWDAF 720 transmits a response to the NF 710 indicating that addition has succeeded in step 704. Upon adding the new analytic information to the NWDAF 720, the NF 710 transmits a request for receiving a current value of analytic information in step 705. Upon receiving the request from the NF 710, the NWDAF 720 immediately transmits a result when calculation of the analytic information is completed in step 706.

When the NF 710 is already aware of available analytic information, steps 701 and 702 may be omitted. When the NF 710 uses existing information provided by the NWDAF 720, steps 703 and 704 may be omitted. In other words, not all steps of FIG. 7 are essential, and at least one operation may be omitted or an operation may be added based on implementation.

Figure 8:
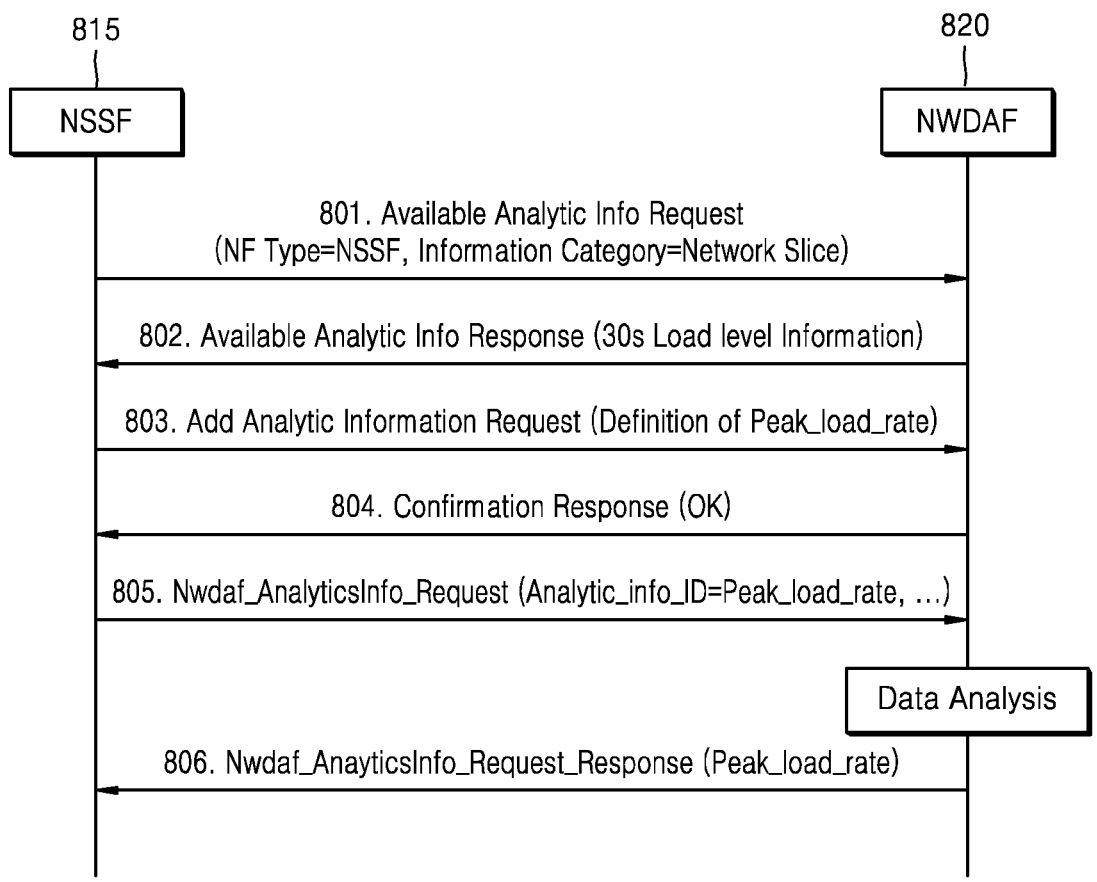
FIG. 8 illustrates a procedure by which an NSSF requests an NWDAF for an information analysis request service, according to an embodiment.

FIG. 8 illustrates an example in which an NSSF 815 uses an NWDAF 820, according to an embodiment.

So as to assign a network slice to a new UE, an NSSF 815 may request load level information of available network slices from an NWDAF 820. In order to receive a list of network slice information provided by the NWDAF 820, the NSSF 815 having an NF ID of XXXXX requests analytic information related to a network slice in step 801. Upon receiving the request from the NSSF 815, the NWDAF 820 may respond that only load level information of average network slices is provided for 30 seconds as current network slice-related information in step 802. The NSSF 815 uses, as network load level information internally used for determination, a percentile rank of highest load level information of a network slice instance for one minute. The NSSF 815 requests the NWDAF 820 to add the percentile rank of the highest load level information of the network slice instance for one minute as a definition of new analytic information called peak_load_rate in step 803. Upon receiving the request, the NWDAF 820 may add peak_load_rate as the available analytic information and respond to the NSSF 815 with respect to the successful addition in step 804. The NSSF 815 may request event subscription from the NWDAF 820 when peak_load_rate of the network slice instance exceeds a load level of a certain value, such as 80%, in step 805. The NWDAF 820 continuously performs data analysis including analysis of peak_load_rate, and notifies the NSSF 815 when the peak_load_rate exceeds the certain load level value in step 806.

Figure 9:
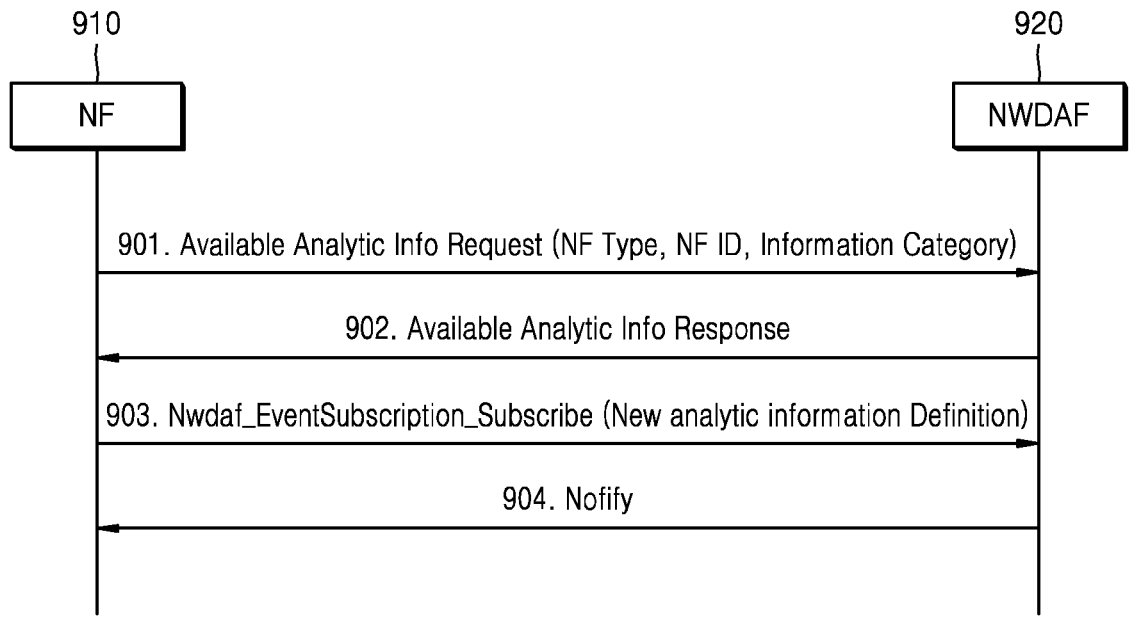
FIG. 9 illustrates a procedure by which an NF uses a simplified event subscription service of an NWDAF, according to an embodiment.

FIG. 9 illustrates a method, performed by an NF 910, of using a simplified event subscription service of an NWDAF 920, according to an embodiment. The method of FIG. 9 is obtained by simplifying embodiments of the disclosure of FIGS. 5 and 6, and a definition of new analytic information is transmitted to the NWDAF as an input while the NF requests subscription of analytic information, instead of explicitly adding the definition of the new analytic information.

A new NF 910 requests available analytic information from an NWDAF 920 for by using an NF type, an NF identifier, or an analytic information category, as a parameter in step 901. Upon receiving the request from the NF 910, the NWDAF 920 provides, as a response, the available analytic information for the NF 910 via an internal method in step 902. The response of the NWDAF 920 may include the available analytic information as a list. Upon receiving the response from the NWDAF 920, the NF 910 determines whether required information is present, and when it is, the NF 910 requests subscription of the information. When required information is not present, the NF 910 transmits a definition of new analytic information to the NWDAF 920 within the subscription request, as an input in step 903. Like an existing method of using an NWDAF 920, the NF 910 may additionally transmit an event filter to the NWDAF 920 and receive newly defined analytic information as an optional event. The NWDAF 920 internally performs data analysis and notifies the NF 910 of a result of the data analysis when a condition of generating a certain event is satisfied in step 904.

When the NF 910 is already aware of available analytic information, steps 901 and 902 may be omitted. In other words, not all steps of FIG. 9 are essential, and at least one operation may be omitted or an operation may be added based on implementation.

Figure 10:
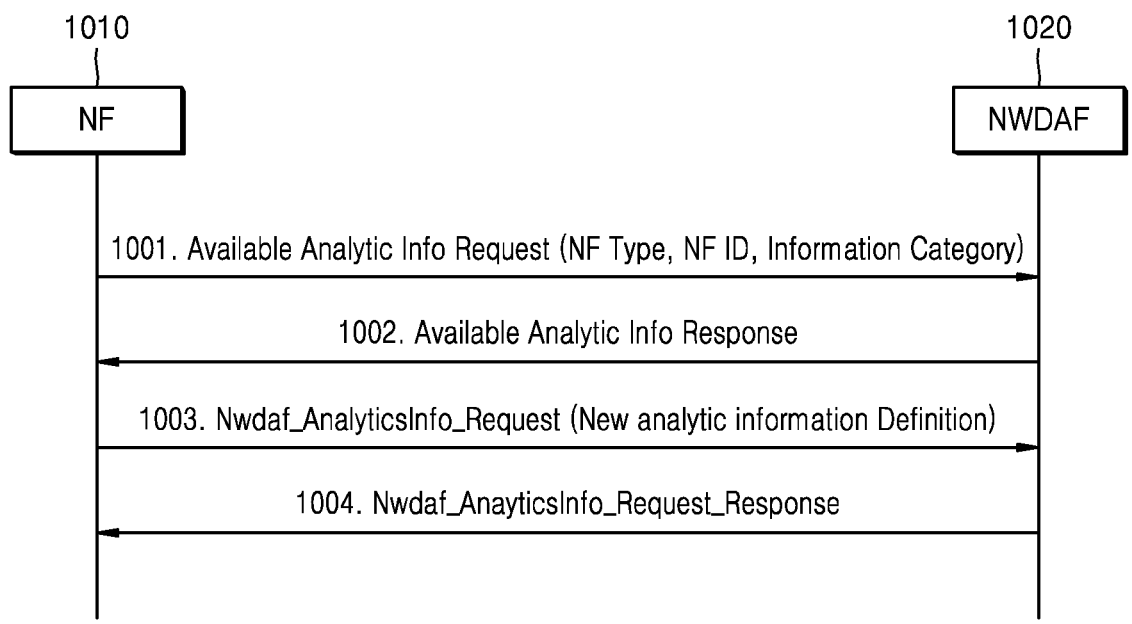
FIG. 10 illustrates a procedure by which an NF uses a simplified information analysis service, according to an embodiment.

FIG. 10 illustrates a method, performed by an NF 1010, of using a simplified information analysis service of an NWDAF 1020, according to an embodiment. The method of FIG. 10 is obtained by simplifying the processes of FIGS. 7 and 8, and is a method of transmitting, to an NWDAF, a definition of new analytic information as an input while requesting information analysis, instead of explicitly requesting the definition of the new analytic information.

A NF 1010 requests an NWDAF 1020 for available analytic information by using its own NF type, NF identifier, or an analytic information category as a parameter in step 1001. Upon receiving the request from the NF 1010, the NWDAF 1020 may provide a response including analytic information available to the NF 1010 via an internal method in step 1002. The response of the NWDAF 1020 may be as a list of analytic information available to the NF 1010. Upon receiving the response from the NWDAF 1020, the NF 1010 determines whether there is required information, and when there is such information, the NF 1010 requests subscription of the information. When there is no such information, the NF 1010 transmits to the NWDAF 1020 a definition of new analytic information within the analysis request, as an input in step 1003. The NWDAF 1020 internally analyzes data and immediately responds to the NF 1010 when the analysis is completed in step 1004.

When the NF is already aware of available analytic information, steps 1001 and 1002 may be omitted. In other words, not all steps of FIG. 10 are essential, and at least one operation may be omitted or an operation may be added based on implementation.

In a 5G system as described above, NFs using a network data analysis service may receive analytic information provided by a current NWDAF, when requested to perform network data analysis via an NWDAF. In addition, when there is no required information, a parameter required for analysis and a method of calculating a result value by using the parameter are transmitted such that it is possible for the NWDAF to provide new analytic information. Accordingly, each NF is able to transmit an analysis method regarding an analysis function that is not basically supported by the NWDAF to the NWDAF for subscription.

Through a method of the disclosure, each NF may remove dependency with respect to a function provided by the NWDAF. In addition, compared to when the NF self-performs data analysis, transmission of analysis data to the NF may be reduced, and an analysis function to be realized internally by each NF is transferred to the NWDAF, thereby simplifying implementation of the NF. When there is a change of a function or analysis method of the NF or the NWDAF, the NF is only notified of a changed matter, thus simplifying maintenance of the NF and NWDAF.

Figure 11:
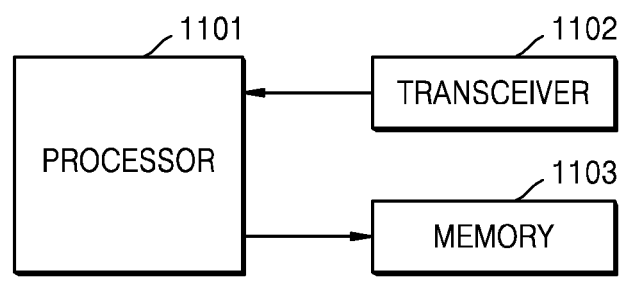
FIG. 11 is a block diagram of an internal structure of a user equipment (UE), according to an embodiment.

FIG. 11 is a block diagram of an internal structure of a UE, according to an embodiment.

Referring to FIG. 11, the UE may include a transceiver 1102, a memory 1103, and a processor 1101, which may operate according to the communication method of the UE described above. However, components of the UE are not limited thereto. For example, the UE may include more or less components than those shown in FIG. 11. In addition, the processor 1101, the memory 1103, and the processor 1101 may be embodied as a single chip.

The transceiver 1102 may transmit and receive a signal to and from a base station. The signal may include control information and data. In this regard, the transceiver 1102 may include a radio frequency (RF) transmitter up-converting and amplifying a frequency of a transmitted signal and an RF receiver performing low-noise amplification on a received signal and down-converting a frequency. However, such components of the transceiver 1102 are only examples, and are not limited to the RF transmitter and the RF receiver.

Transceiver 1102 may receive a signal via a wireless channel and output the signal to the processor 1101, and transmit a signal output from the processor 1101 via the wireless channel.

The memory 1103 may store a program and data required for an operation of the UE, may store control information or data included in a signal obtained by the UE, may include a storage medium, such as read-only memory (ROM), random-access memory (RAM), a hard disk, a CD-ROM, or a digital versatile disc (DVD), or a combination thereof, may include a plurality of memories, and may store a program for supporting beam-based cooperative communication.

The processor 1101 may control a series of processes such that the UE operates according to the embodiment of the disclosure. Only some of the steps of the processor 1101 have been described, but the processor 1101 may control all processes such that the UE may operate according to all or some of the embodiments of the disclosure.

Figure 12:
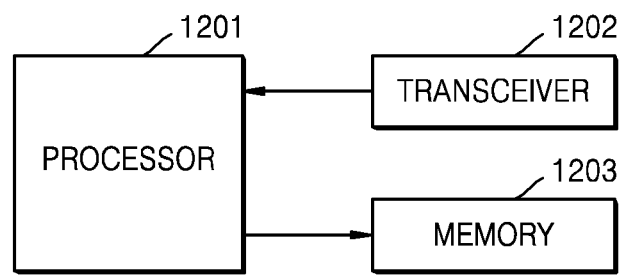
FIG. 12 is a block diagram of an internal structure of a network entity, according to an embodiment.

FIG. 12 is a block diagram of an internal structure of a network entity, according to an embodiment.

Referring to FIG. 12, the network entity may include a transceiver 1202, a memory 1203, and a processor 1201, which may operate according to the communication method of the network entity described above. However, components of the network entity are not limited thereto. For example, the network entity may include more or less components than those shown in FIG. 12. In addition, the processor 1201, the memory 1203, and the processor 1201 may be embodied as a single chip. The network entity may include entities included in a base station and a core network, may include the NF described above, and may include an AMF and an SMF, for example.

The transceiver 1202 may transmit and receive a signal to and from a UE, a network entity, or a base station. The signal may include control information and data. In this regard, the transceiver 1202 may include an RF transmitter up-converting and amplifying a frequency of a transmitted signal and an RF receiver performing low-noise amplification on a received signal and down-converting a frequency. However, such components of the transceiver 1202 are only examples, and are not limited to the RF transmitter and the RF receiver.

The transceiver 1202 may receive a signal via a wireless channel and output the signal to the processor 1201, and transmit a signal output from the processor 1201 via the wireless channel.

The memory 1203 may store a program and data required for an operation of the network entity, may store control information or data included in a signal obtained by the network entity, may include a storage medium, such as ROM, RAM, a hard disk, a CD-ROM, or a DVD, or a combination thereof, may include a plurality of memories, and may store a program for supporting beam-based cooperative communication.

The processor 1201 may control a series of processes such that the network entity may transmit a request for available analytic information to an NWDAF and receive a response including available analytic information from the NWDAF. The processor 1201 may perform only some steps described herein, but alternatively, may control all processes such that the network entity may operate according to all or some of the embodiments of the disclosure.

Disclosed is an apparatus and method capable of effectively providing a service in a mobile communication system Methods according to embodiments of the disclosure described herein may be implemented as hardware, software, or a combination of hardware and software.

When implemented as software, a computer-readable storage medium or computer program product storing at least one program (software module) may be provided. The at least one program stored in the computer-readable storage medium or computer program product is configured to be executable by one or more processors in an electronic device. The one or more processors include instructions causing the electronic device to execute the methods according to an embodiment described in the claims or the specification of the disclosure.

The at least one program (the software module, the software) may be stored in a non-volatile memory including a RAM and a flash memory, a ROM, an electrically erasable programmable read-only memory (EEPROM), a magnetic disc storage device, a compact disc-ROM (CD-ROM), DVDs, other optical storage devices, a magnetic cassette, or the like, or a memory configured with any or all combinations thereof. Also, each of the configured memories may be provided in a multiple number.

The at least one program may be stored in an attachable storage device that can be accessed via a communication network including the Internet, an Intranet, a local area network (LAN), a wide LAN (WLAN), or a storage area network (SAN), or a combination thereof. The storage device may access, via an external port, an apparatus for performing embodiments of the disclosure. A separate storage device on a communication network may access the apparatus for performing embodiments of the disclosure.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method of adding a type of network-related analysis information provided by a network data analytics function (NWDAF), to the NWDAF, the method comprising:
   receiving, by the NWDAF, an analytic information addition request requesting an addition of new network-related analytic information to a list of available network-related analytic information in the NWDAF; and
   transmitting, from the NWDAF, a response message including information about whether the new network-related analytic information has been added to the list of available network-related analytic information, in response to the analytic information addition request,
   wherein the network-related analytic information is obtained by analyzing information collected from at least one entity in a network, and
   wherein the analytic information addition request includes information about a definition of the new network-related analytic information.

2. The method of claim 1, further comprising:
   requesting the list of available analytic information;
   providing the list of available analytic information in response to the request; and receiving a subscription request of the analytic information, wherein the new network-related analytic information is not included in the list of available analytic information, and wherein the analytic information addition request is included in the subscription request of analytic information.

3. The method of claim 1, wherein the analytic information addition request further comprises at least one of information about a name of the new network-related analytic information, description information about the new network-related analytic information, algorithm information for calculating the new network-related analytic information, and an event filter definition for efficient selection of the new network-related analytic information.

4. The method of claim 1, wherein the analytic information addition request is received directly from a network function (NF), or from an application function (AF) through a network exposure function (NEF).

5. A method of adding a type of network-related analytic information provided by a network data analytics function (NWDAF) to the NWDAF, the method comprising:

transmitting, to the NWDAF, an analytic information addition request requesting an addition of new network-related analytic information to a list of available network-related analytic information in the NWDAF; and receiving, from the NWDAF, a response message including information about whether the new network-related analytic information has been added to the list of available network-related analytic information, in response to the analytic information addition request, wherein the network-related analytic information is obtained by analyzing information collected from at least one entity in a network, and wherein the analytic information addition request includes information about a definition of the new network-related analytic information.

6. The method of claim 5, further comprising:

requesting the list of analytic information available to the NWDAF;

obtaining the list of analytic information available to the NWDAF, in response to the request; and transmitting a subscription request of the analytic information, wherein the new network-related analytic information is not included in the list of analytic information available to the NWDAF, and wherein the analytic information addition request is included in the subscription request of analytic information.

7. The method of claim 5, wherein the analytic information addition request further comprises at least one of information about a name of the new network-related analytic information, description information about the new network-related analytic information, algorithm information for calculating the new network-related analytic information, and an event filter definition for efficient selection of the new network-related analytic information.

8. The method of claim 5, wherein the analytic information addition request is transmitted to the NWDAF directly or through a network exposure function (NEF).

9. A network data analytics function (NWDAF) comprising:

a transceiver; and at least one processor coupled with the transceiver and configured to receive, by the NWDAF, an analytic information addition request requesting addition of new network-related analytic information to a list of available network-related analytic information in the NWDAF, and transmit, from the NWDAF, a response message including information about whether the new network-related analytic information has been added to the list of available network-related analytic information in the NWDAF, in response to the analytic information addition request, wherein the network-related analytic information is obtained by analyzing information collected from at least one entity in a network, and wherein the analytic information addition request includes information about a definition of the new network-related analytic information.

10. The NWDAF of claim 9, wherein the at least one processor is further configured to request the list of analytic information available to the NWDAF, provide the list of analytic information available to the NWDAF, in response to the request, and receive a subscription request of analytic information, wherein the new network-related analytic information is not included in the list of analytic information available to the NWDAF, and wherein the analytic information addition request is included in the subscription request of analytic information.

11. The NWDAF of claim 9, wherein the analytic information addition request further comprises at least one of information about a name of the new network-related analytic information, description information about the new network-related analytic information, algorithm information for calculating the new network-related analytic information, and an event filter definition for efficient selection of the new network-related analytic information.

12. The NWDAF of claim 9, wherein the at least one processor is further configured to receive the analytic information addition request from a network function (NF) directly or from an application function (AF) through a network exposure function (NEF).

13. A network function (NF) comprising:

a transceiver; and at least one processor coupled with the transceiver and configured to transmit, to a network data analytics function (NWDAF), an analytic information addition request requesting addition of new network-related analytic information to a list of available network-related analytic information in the NWDAF, and receive, from the NWDAF, a response message including information about whether the new network-related analytic information has been added to the list of available network-related analytic information in the NWDAF, in response to the analytic information addition request, wherein the new network-related analytic information is obtained by analyzing information collected from at least one entity in a network, and wherein the analytic information addition request includes information about a definition of the new network-related analytic information.

14. The NF of claim 13,
wherein the at least one processor is further configured to request the list of analytic information available to the NWDAF, obtain the list of analytic information available to the NWDAF in response to the request, and transmit a subscription request of analytic information,
wherein the new network-related analytic information is not included in the list of analytic information available to the NWDAF, and
wherein the analytic information addition request is included in the subscription request of analytic information.

15. The NF of claim 13,
wherein the analytic information addition request further comprises at least one of information about a name of the new network-related analytic information, description information about the new network-related analytic information, algorithm information for calculating the new network-related analytic information, and an event filter definition for efficient selection of the new network-related analytic information.

16. The NF of claim 13,
wherein the at least one processor is further configured to transmit the analytic information addition request to the NWDAF directly or through a network exposure function (NEF).

17. A method of providing network-related analytic information available to a network data analytics function (NWDAF), the method comprising:
receiving a provision request of a list of available network-related analytic information; and
providing the list of available network-related analytic information in response to the request,
wherein the available network-related analytic information is obtained by analyzing information collected from at least one network function (NF) and at least one application function (AF) in a network, and
wherein the provision request from a network function (NF) is directly received, and the provision request from an application function (AF) is received through a network exposure function (NEF).

18. The method of claim 17,
wherein the provision request comprises at least one of information about a type of NF requesting the list, identification information of the NF requesting the list, and category information of the available network-related analytic information.

19. The method of claim 18,
wherein providing the list comprises providing a list of network-related analytic information related to the NF, based on the identification information of the NF.

* * * * *